(12) United States Patent
Hashimoto et al.

(10) Patent No.: US 7,295,334 B2
(45) Date of Patent: Nov. 13, 2007

(54) IMAGE PROCESSING APPARATUS HAVING CONFIGURABLE PROCESSORS

(75) Inventors: Koichi Hashimoto, Amimachi (JP); Kazuhiro Kamoshida, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 740 days.

(21) Appl. No.: 09/821,095

(22) Filed: Mar. 30, 2001

(65) Prior Publication Data

US 2002/0082716 A1   Jun. 27, 2002

(30) Foreign Application Priority Data

Mar. 31, 2000   (JP) ............................. 2000-097251

(51) Int. Cl.
*G06F 15/00* (2006.01)
*G06F 3/12* (2006.01)

(52) U.S. Cl. ................... 358/1.15; 358/1.13; 358/1.16; 382/303; 382/304

(58) Field of Classification Search .................... 700/2, 700/4; 382/304, 303, 276, 252, 307, 302; 358/1.15, 1.1, 1.13, 1.6, 1.11, 1.9, 1.2, 1.16, 358/1.17, 1.18, 407, 468, 462, 539, 523; 345/506, 502, 505; 712/30, 40, 35, 43, 28, 712/10, 11, 16, 18, 32

See application file for complete search history.

(56) References Cited

U.S. PATENT DOCUMENTS

| | | | | |
|---|---|---|---|---|
| 4,514,826 A | * | 4/1985 | Iwata et al. | 707/7 |
| 4,777,590 A | * | 10/1988 | Durkos et al. | 712/43 |
| 5,617,476 A | * | 4/1997 | Ibaraki et al. | 380/267 |
| 5,903,574 A | * | 5/1999 | Lyons | 714/704 |
| 5,978,831 A | * | 11/1999 | Ahamed et al. | 718/105 |
| 6,366,951 B1 | * | 4/2002 | Schmidt | 709/208 |

* cited by examiner

*Primary Examiner*—Dov Popovici
(74) *Attorney, Agent, or Firm*—Nixon Peabody LLP; Donald R. Studebaker

(57) ABSTRACT

An image processing apparatus includes at least two signal processor modules interconnected each other in series. Each of the signal processor modules has an input port through which data is input, a memory which stores data, a signal processor portion which carries out processing on input data according to program and an output port through which data is output. At least one of the signal processor modules outputs, through its output port, input data unprocessed and processed data obtained by carrying out processing on the input data according to the program.

4 Claims, 13 Drawing Sheets

|   | DSP1 → DSP2 | DSP2 → DSP3 | DSP3 → DSP4 |
|---|---|---|---|
| V | 70 ⇒ 90 | 110 ⇒ 132 | 120 ⇒ 128 |
| B | 4 | 6 | 8 |
| V/B | 17.5 ⇒ <u>22.5</u> | <u>18.3</u> ⇒ 22 | 15.0 ⇒ 16.0 |

⇒CHANGED DATA VOLUME

|   | DSP1 → DSP2 | DSP2 → DSP3 | DSP3 → DSP4 |
|---|---|---|---|
| V | 70 ⇒ 90 | 110 ⇒ <u>132</u> | <u>120</u> ⇒ 128 |
| B | 8 | 8 | 8 |
| V/B | 8.75 ⇒ 11.25 | 13.75 ⇒ <u>16.5</u> | <u>15.0</u> ⇒ 16.0 |

⇒CHANGED DATA VOLUME

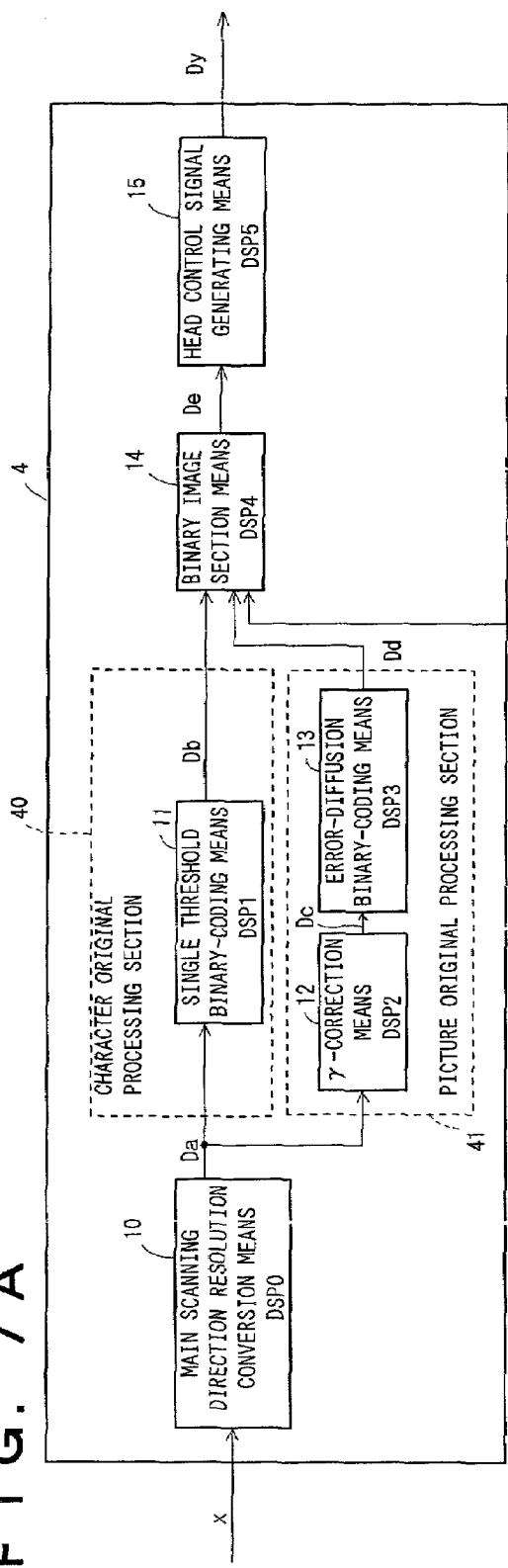
F I G. 7A
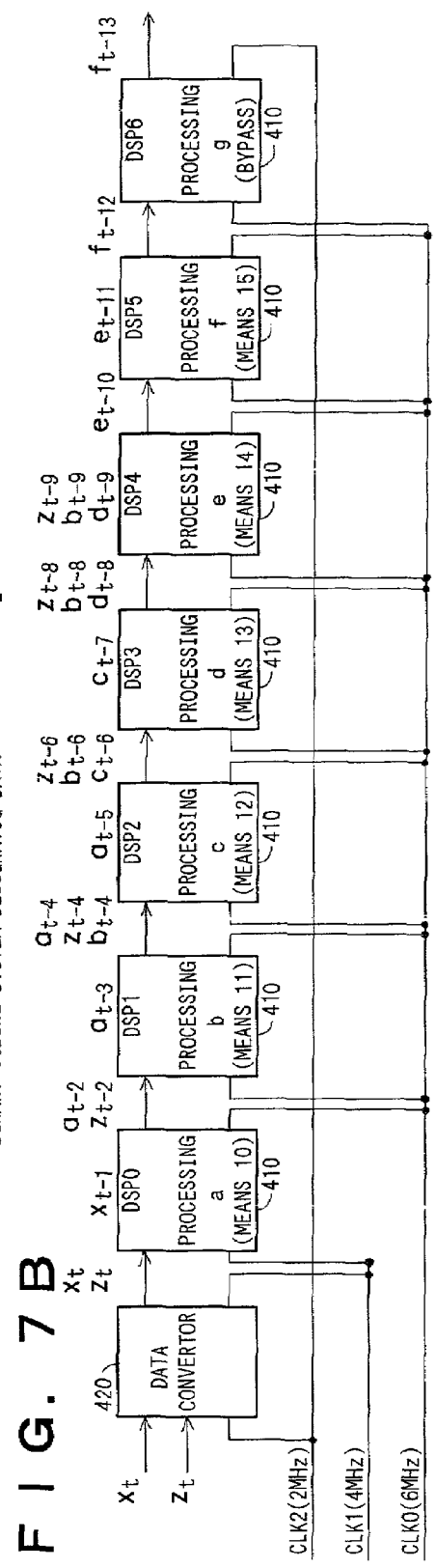
F I G. 7B

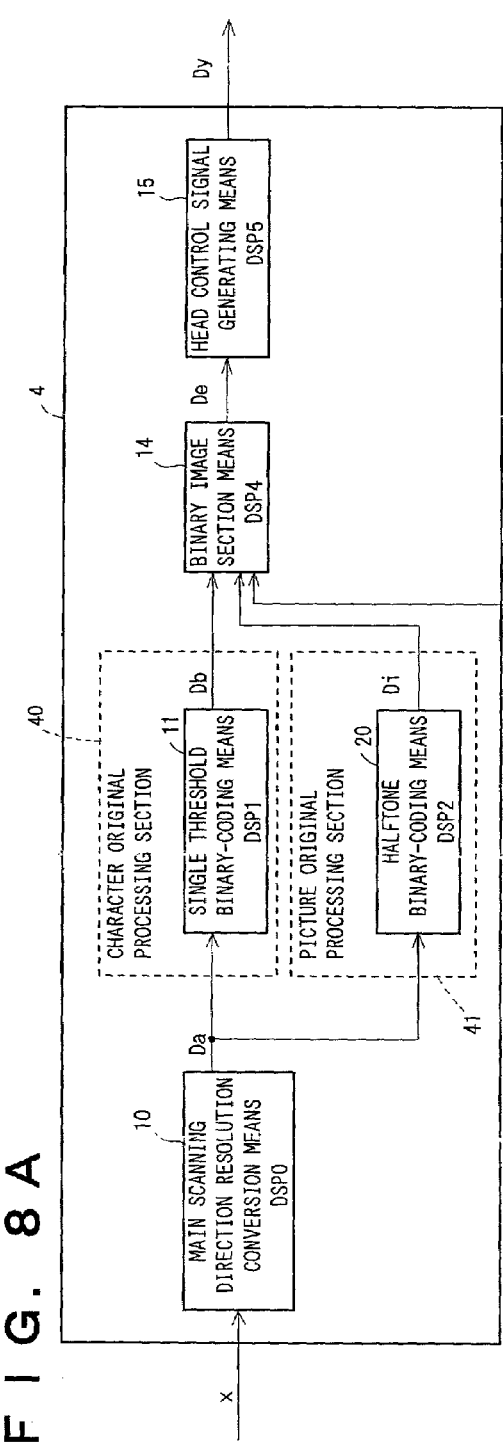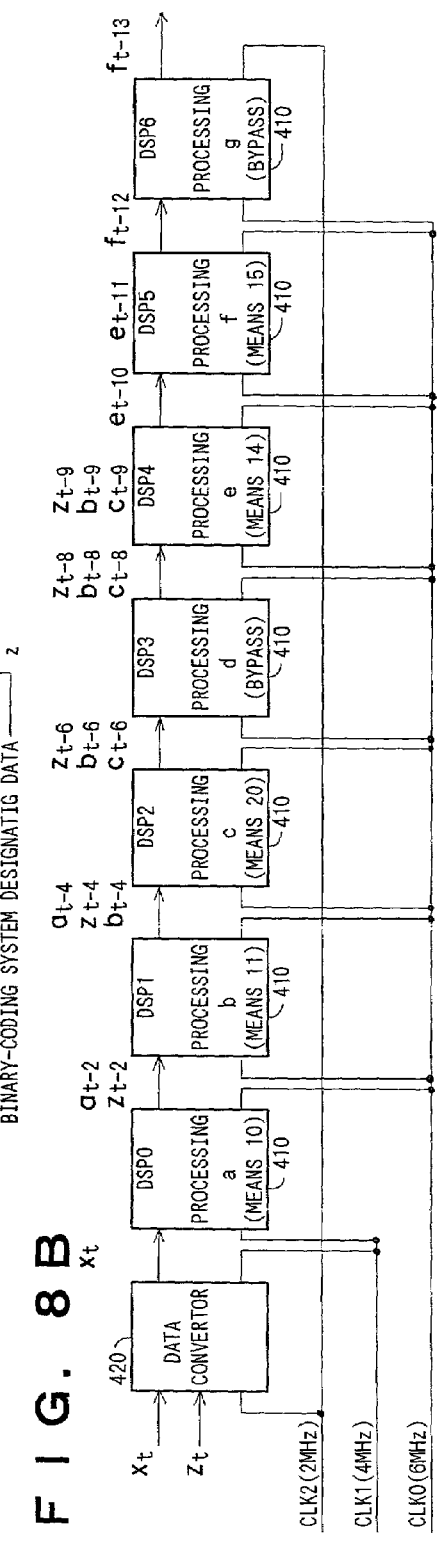

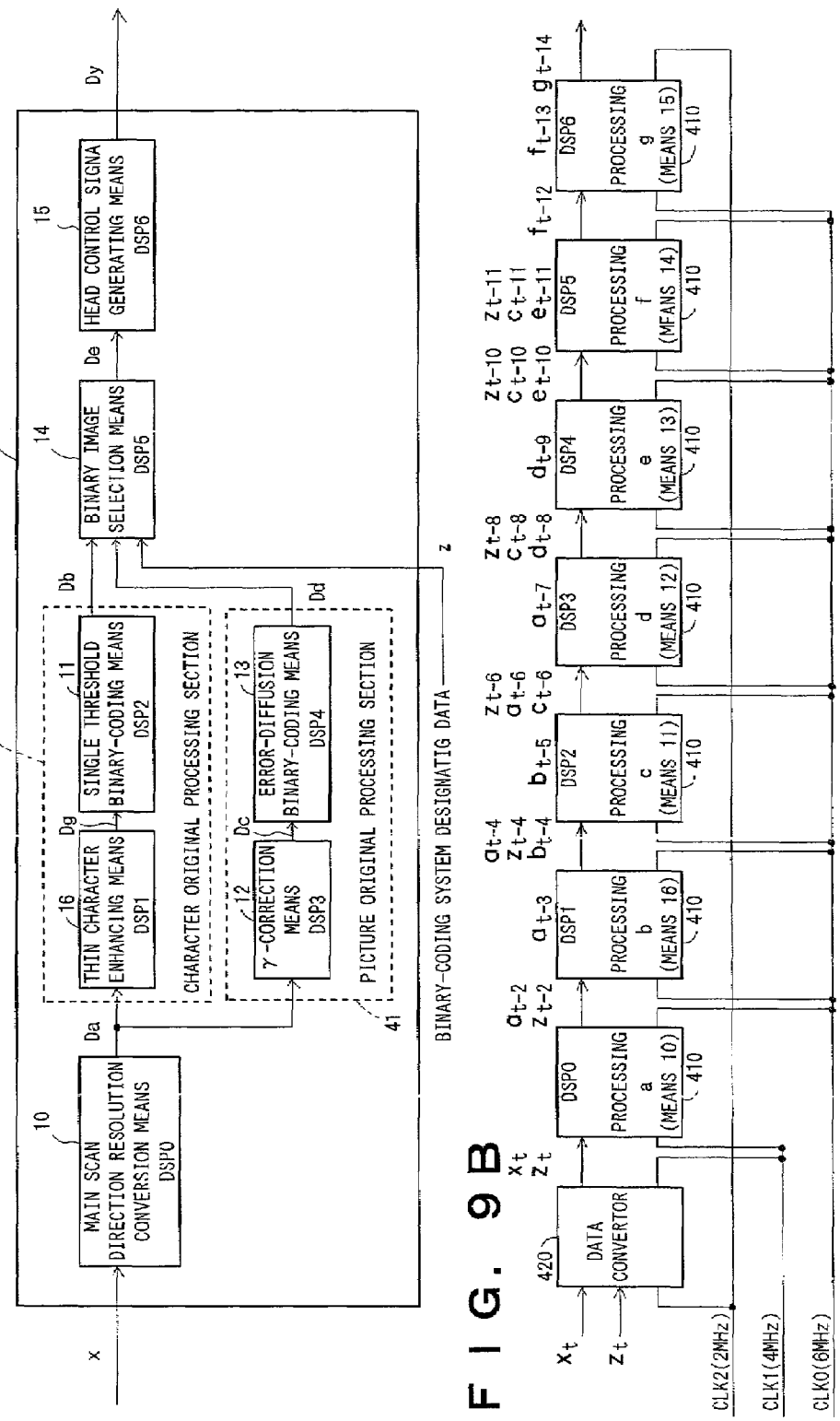

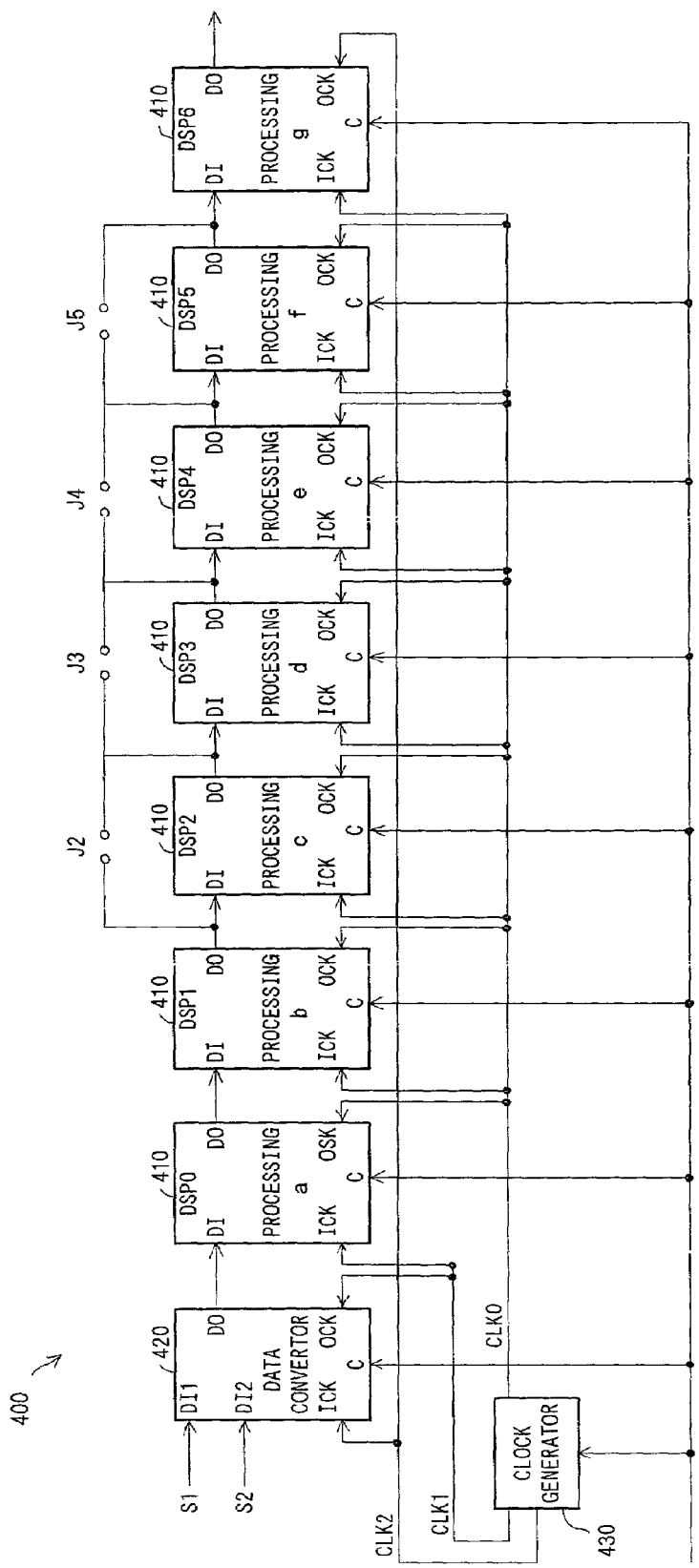
F I G. 11

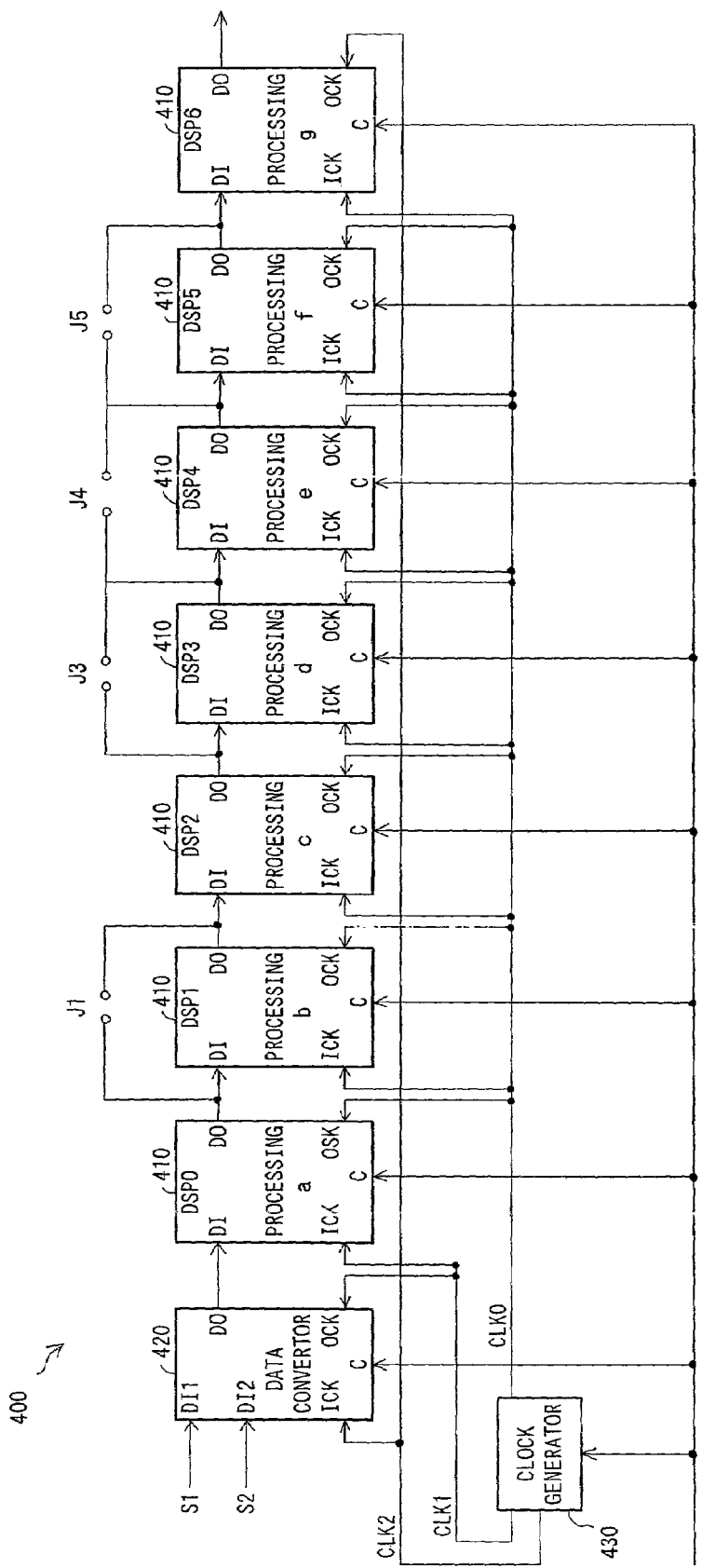
F I G. 12

IMAGE PROCESSING APPARATUS HAVING CONFIGURABLE PROCESSORS

BACKGROUND OF THE INVENTION

1. Field of the Invention

This invention relates to an image processing apparatus formed by interconnecting DSP modules in two or more stages.

2. Description of the Related Art

As an image processing apparatus which can flexibly deal with change in the contents of the image processing and/or addition of contents by only changing the software without changing the circuit boards, there have been known those employing DSP (digital signal processor) modules for signal processing only. The DSP module comprises a signal processor unit which carries out image processing according to program data and a peripheral unit including an input port, a memory and an output port.

In an image processing apparatus employing a DSP module, the overall image processing is generally carried out by one DSP module. When high speed processing is required, the overall image processing is sometimes divided into a plurality of fractions and each fraction of the image processing is carried out by one DSP module. That is, a multi-DSP arrangement is sometimes employed by interconnecting a plurality of DSP modules so that the image processing is carried out by the DSP modules in a pipeline processing (simultaneous parallel processing) system.

For example, when the overall image processing is to be distributed to means A to F as shown in FIG. 14A, functions of means A to F are respectively assigned to DSP modules DSP0, DSP2, DSP4, DSP5, DSP7 and DSP8. Each DSP module carries out designated processing on data input through the input port according to designated program data and outputs processed data through the output port.

In the illustrated example, spare DSP modules are provided for groups of means each surrounded by broken lines in FIG. 14A. More specifically, a spare DSP module DSP1 is provided for the DSP module DSP0, a spare DSP module DSP3 is provided for the DSP module DSP2, a spare DSP module DSP6 is provided for the DSP modules DSP4 and DSP5, and a DSP module DSP9 is provided for the DSP modules DSP7 and DSP8. Normally, these spare DSP modules are caused to operate as data bypass portions which transfers data as-input through the input port to the output port.

When the content of processing by the means A is to be changed, the program data for the DSP module DSP0 is changed. When means G is to be added behind the means A, the program data for the means G is input into the spare DSP module DSP1 and the means G is assigned to the spare DSP module DSP1. When means G is to be added before the means A, the program data for the DSP module DSP0 is changed to the program data for the means G, the program data for the means A is input into the spare DSP module DSP1 and then the means G and A are respectively assigned to the DSP modules DSP0 and DSP1.

In this manner, by employing a multi-DSP arrangement, change in the contents of the image processing and/or addition of contents can be flexibly dealt with by only changing the software without changing the circuit boards.

However, in the image processing apparatus of a multi-DSP arrangement, each DSP module functions as a processing portion corresponding to each means or a data bypass portion, and accordingly, when the means are connected in series, the DSP modules are also connected in series and when the means are connected in parallel, the DSP modules are also connected in parallel. That is, the DSP modules must be connected in the same manner as the means.

Though parallel addition of contents of the processing can be dealt with by connecting in parallel spare DSP modules in a number corresponding to an expected number of parallel processing portions, this approach is disadvantageous in that the size of the circuit becomes too large. That is, in the conventional multi-DSP arrangement, it is difficult to deal with addition of parallel processing with the processing speed kept unchanged without enlarging the circuit size by simply changing the software.

When processing in one or more means becomes unnecessary, the DSP module(s) assigned to the means must be caused to function as a data bypass portion with the DSP module(s) left on the circuit board in vain.

SUMMARY OF THE INVENTION

In view of the foregoing observations and description, the primary object of the present invention is to provide an image processing apparatus of a multi-DSP arrangement which can deal with addition of parallel processing with the processing speed kept unchanged and without enlarging the circuit size by simply changing the software.

Another object of the present invention is to provide an image processing apparatus of a multi-DSP arrangement which can deal with reduction in function without using a component in vain and can easily deal with expansion in function.

The image processing apparatus in accordance with the present invention comprises at least two signal processor modules interconnected each other in series, each of the signal processor modules having an input port through which data is input, a memory which stores data, a signal processor portion which carries out processing on input data according to program and an output port through which data is output, and is characterized in that at least one of the signal processor modules outputs both unprocessed input data and processed data obtained by processing the input data.

It is preferred that said at least one of the signal processor modules stores within one cycle in the memory unprocessed input data as input through the input port and processed data obtained by reading out and processing unprocessed input data stored in the memory predetermined number of cycles before and outputs within one cycle through the output port unprocessed data and processed data stored in the memory predetermined number of cycles before. In this case, it is preferred that the other signal processor module(s) stores within one cycle in the memory unprocessed input data as input through the input port and processed data obtained by reading out and processing unprocessed input data stored in the memory predetermined number of cycles before and outputs within one cycle through the output port processed data stored in the memory predetermined number of cycles before, or stores in the memory unprocessed input data as input through the input port and outputs through the output port unprocessed input data stored in the memory predetermined number of cycles before.

The "predetermined number of cycles" should be interpreted to include a single cycle.

In this case, it is further preferred that the image processing apparatus be provided with a synchronous circuit which causes data transfer between signal processor modules to occur in synchronization with clocks which are the same in phase and frequency.

Further, when the image processing apparatus is provided with such a synchronous circuit, it is preferred that the data transfer widths between the signal processor modules be equal to each other and the synchronous circuit determines the frequency of the transfer clock on the basis of the data transfer rate between the pair of signal processor modules between which the largest amount of data is to be transferred.

Further, it is preferred that a mounting means on which a signal processor module is removably mounted be provided for at least one of the signal processor modules and a switching means be provided for said at least one signal processor module to transfer data to the signal processor module through its input port when it is mounted on the mounting means and to transfer the same to a component rearward of the signal processor module when it is not mounted on the mounting means.

In the image processing apparatus of this invention, at least one of the signal processor modules outputs, through its output port, input data unprocessed and processed data obtained by carrying out processing on the input data according to the program, and accordingly, a signal processor module disposed rearward of said at least one module can use the unprocessed data, whereby the image processing apparatus can be changed so that parallel processing which requires for at least two modules to use the same data can be carried out without giving rise to a problem of circuit size and with the modules kept connected in series. Since such a change can be carried out easily by simply changing the software, a problem of processing speed does not arise.

Further, by interconnecting a plurality of signal processor modules including therein at least one signal processor modules which outputs, through its output port, input data unprocessed and processed data obtained by carrying out processing on the input data according to the program, change and/or addition of contents of image processing which involves change in arrangement of the image processing section can be flexibly dealt with without changing the connection of the modules. Further, the same circuit can be used in common by a plurality of image processing apparatuses different in contents of processing, which results in reduction in manufacturing cost of image processing apparatuses.

Further, when storing unprocessed data and/or processed data in the memory and reading out unprocessed data and/or processed data from the memory to output it through the output port are carried out every predetermined cycles, predetermined data can be transferred between all the pairs of modules in predetermined cycles, whereby pipeline processing can be carried out without delay to input of data from the external and/or output of data to the external.

When the image processing apparatus is provided with a synchronous circuit which causes data transfer between signal processor modules to occur in synchronization with clocks which are the same in phase and frequency, noise is less apt to be generated as compared with when the frequency of the data transfer clock is determined module by module according to the data volume and the data transfer port width.

When the data transfer widths between the signal processor modules are set all equal to each other and the synchronous circuit determines the frequency of the transfer clocks on the basis of the data transfer rate between the pair of signal processor modules between which the largest volume of data is to be transferred, the frequency of the clocks can be determined solely taking into account the volume of data to be transferred between pairs of modules, whereby change and/or addition of contents of image processing can be more flexibly dealt with.

When a mounting means on which a signal processor module is removably mounted is provided for at least one of the signal processor modules and a switching means is provided for said at least one signal processor module to transfer data to the signal processor module through its input port when it is mounted on the mounting means and to transfer the same to a component rearward of the signal processor module when it is not mounted on the mounting means, modules which become unnecessary due to reduction in function of the image processing apparatus can be removed without adversely affecting the function of the image processing apparatus, whereby the image processing apparatus can be provided solely with necessary modules. At the same time, increase in functions can be dealt with by adding modules. Accordingly, the problem that the image processing apparatus is provided with modules which are excessive to the functions to be executed can be avoided.

BRIEF DESCRIPTION OF THE DRAWINGS

FIG. 7A is a block diagram showing a first example of the image processing section of the stencil printing system which is divided into means on the basis of function, FIG. 7B is a block diagram showing a state where the image processing section of the first example is formed by the image processing apparatus of the first embodiment of the present invention, FIG. 8A is a block diagram showing a second example of the image processing section of the stencil printing system which is divided into means on the basis of function, FIG. 8B is a block diagram showing a state where the image processing section of the second example is formed by the image processing apparatus of the first embodiment of the present invention, FIG. 9A is a block diagram showing a third example of the image processing section of the stencil printing system which is divided into means on the basis of function, FIG. 9B is a block diagram showing a state where the image processing section of the third example is formed by the image processing apparatus of the first embodiment of the present invention, FIG. 11 is a block diagram showing a fifth example of the image processing section of the stencil printing system where at least a part of the DSP modules is removable, FIG. 12 is a block diagram showing a sixth example of the image processing section of the stencil printing system where at least a part of the DSP modules is removable.

DESCRIPTION OF THE PREFERRED EMBODIMENT

Figure 1:
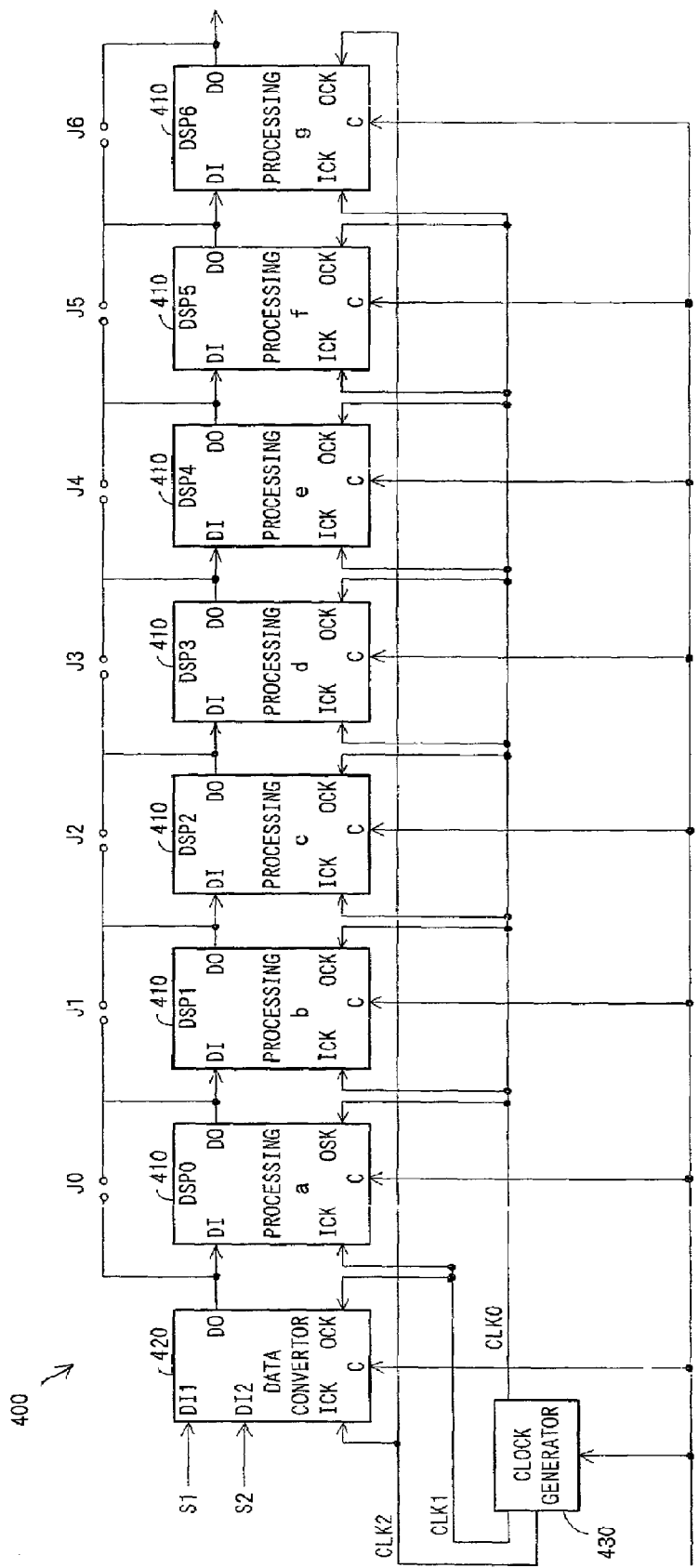
FIG. 1 is a block diagram showing an image processing apparatus in accordance with a first embodiment of the present invention.

In FIG. 1, an image processing apparatus 400 in accordance with an embodiment of the present invention comprises first to seventh stage DSP modules 410 (DSP0 to DSP6) interconnected each other in a cascade connection. The DSP modules 410 respectively carry out processing a to processing g according to program data and output processed data a to processed data g.

A data convertor 420 is provided before the first DSP module DSP0. The data convertor 420 is provided with a pair of data input ports DI1 and DI2 and a single data output port DO, and each of the DSP modules 410 is provided with a single data input port DI and a single data output port DO. The data input ports DI1 and DI2 and DI and the data output ports DO of the data convertor 420 and the DSP modules 410 are the same in port width (data transfer port width) (=N).

The image processing apparatus 400 is provided with a clock generator 430 as a synchronous circuit, and the clock generator 430 inputs clocks CLK0 to CLK2 into the DSP modules 410 and the data convertor 420 in the following manner.

That is, the clock CLK0 is used as the input clocks ICK and the output clocks OCK for the DSP modules DSP1 to DSP5, the output clock OCK for the DSP module DSP0 and the input clock ICK for the DSP module DSP6 so that the clocks for data transfer between all the pairs of DSP modules 410 are the same in phase and frequency and the data transfer between all the pairs of DSP modules 410 is effected synchronously. With this arrangement, noise is less apt to be generated as compared with when the frequency of the data transfer clock is determined DSP module by DSP module according to the data volume and the data transfer port width.

Further, the clock CLK1 is used as the output clock OCK for the data convertor 420 and the input clock ICK for the first stage DSP module DSP0 so that data transfer from the data convertor 420 to the first stage DSP module DSP0 is effected synchronously.

Further, as the input clock ICK for two pieces of data S1 and S2 into the data convertor 420, the clock CLK2 is used.

The data transfer port widths between all the pairs of DSP modules are equal to each other and the frequency of the clock CLK0 for data transfer between all the pairs of DSP modules is determined on the basis of the data transfer rate between the pair of DSP modules of the largest data transfer (the pair of DSP modules between which the largest amount of data is to be transferred).

The data transfer rates CLK0 between all the pairs of DSP modules are set so that the whole data can be transferred in a predetermined number of cycles as serial data between the pair of DSP modules of the largest data transfer, and the relation between the data transfer rate CLK1 between the data convertor 420 and the first stage DSP module DSP0 and the data transfer rate CLK2 between the data convertor 420 and the component connected forward thereof and between the last stage DSP module DSP6 and the component rearward thereof is set to conform to the data transfer rates CLK0.

The serial data is data comprising a plurality of pieces of data, each made up of a plurality of pieces of pixel data, arranged in sequence bit by bit. The pieces of data may be arranged either in the pixel order or in the data order. For example, pieces of data A(i), B(i), C(i) (i standing for the number of pixel) may be arranged in the order of A(0), B(0), C(0), A(1), B(1), C(1), ..., A(n), B(n), C(n) or in the order of A(0), A(1), ..., A(n), B(0), B(1), ..., B(n), C(0), C(1), ..., C(n).

For example, when the largest amount data to be transferred between a pair of DSP modules corresponds to M cycles, the frequency of the clock CLK1 is set to twice that of the clock CLK2 and the frequency of the clock CLK0 is set to M times that of the clock CLK2. When the amount of data to be transferred between the other pairs of DSP modules 410 corresponds to not larger than (M−1) cycles, the excessive time is set as awaiting time. With this arrangement, predetermined data can be transferred between each pair of DSP modules 410 within a predetermined number of cycles and pipeline processing can be carried out without delay.

The DSP modules 410 (DSP0 to DSP6), the data convertor 420 and the clock generator 430 are connected to a CPU (not shown) by way of a CPU bus so that the clock frequency can be set and program data can be loaded in the DSP modules 410 (DSP0 to DSP6).

Further, as shown in FIG. 1, short circuiting terminals J0 to J6 are connected in parallel to the respective DSP modules DSP0 to DSP6 so that the component connected forward of each of the DSP modules DSP0 to DSP6 can be connected to the component rearward of the DSP module selectively by way of the DSP module or the short circuiting terminals, while each of the DSP modules DSP0 to DSP6 are mounted on the circuit board by way of a socket or the like to be removable from the circuit board. For example, when the second stage DSP module DSP1 is mounted on the circuit board, the first stage DSP module DSP0 input data into the data input port DI of the second stage DSP module DSP1, whereas the second stage DSP module DSP1 is not mounted on the circuit board, the first stage DSP module DSP0 input data into the data input port DI of the third stage DSP module DSP2 through the short circuiting terminals J1.

Figure 2:
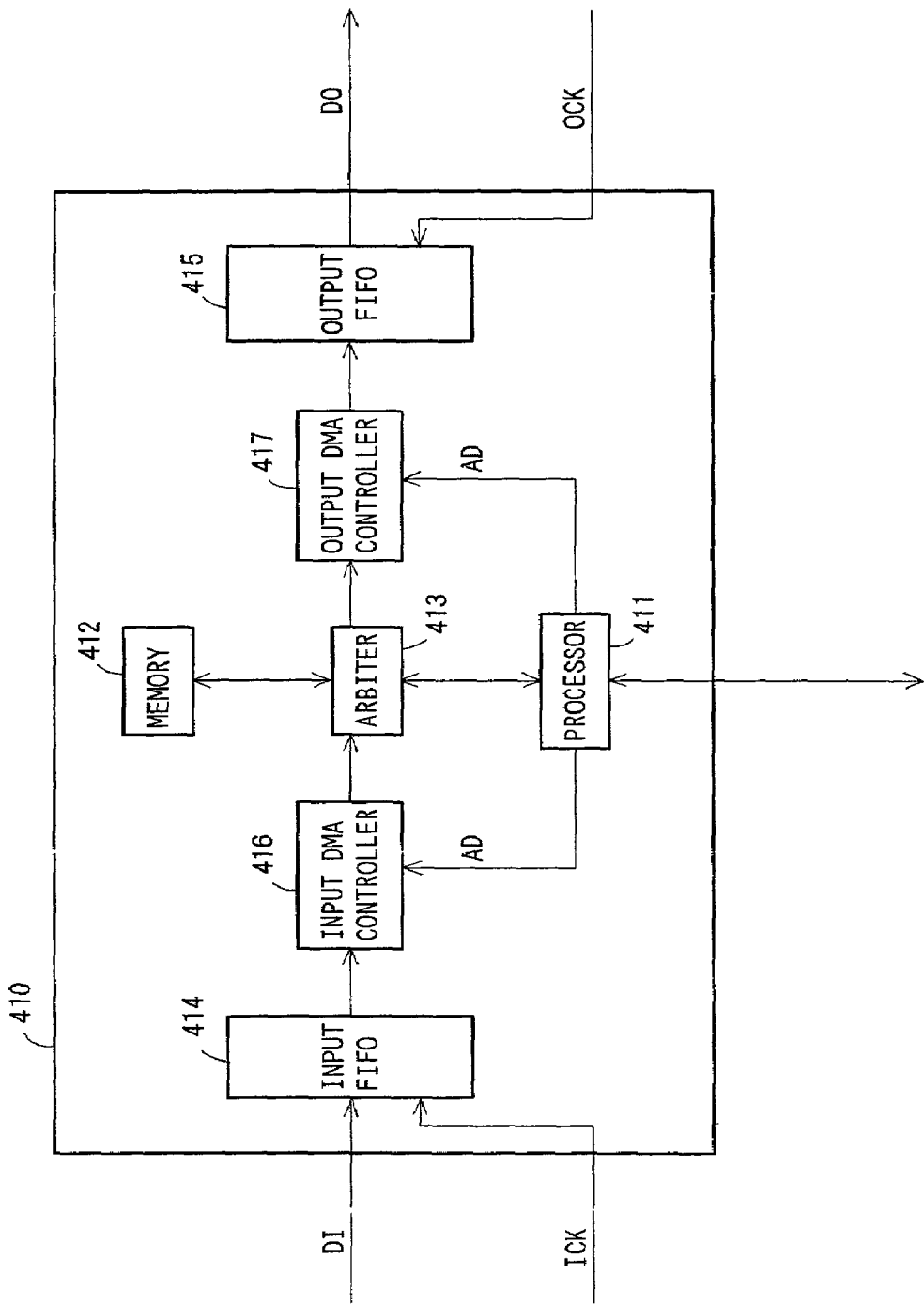
FIG. 2 is a block diagram showing in detail the DSP module.

As shown in detail in FIG. 2, each DSP module 410 comprises a signal processor 411 which carries out image processing on image data according to program, a memory 412, an arbiter 413, an input FIFO (first-in, first-out) 414, an output FIFO 415, an input DMA (direct memory access) controller 416 and an output DMA controller 417.

The memory 412 stores program data and predetermined data. The predetermined data includes, for example, data which is used for processing and at the same time bypassed, data which is used for processing but is not bypassed, data which is not used for processing but is bypassed, and processed data.

The input FIFO 414 temporarily stores input data DI, thereby absorbing difference in timing due to the fact that the clock for the input DMA controller 416 and the input clock ICK are asynchronous.

The output FIFO 415 temporarily stores output data DO, thereby absorbing difference in timing due to the fact that the clock for the output DMA controller 417 and the output clock OCK are asynchronous.

The input DMA controller 416 has a counter therein, assigns addresses to a plurality of pieces of data input in the form of serial data with the address AD loaded by the processor 411 set as the starting address, and writes the pieces of data in the memory 412 at the assigned addresses.

The output DMA controller 417 reads data from the memory 412 on the basis of the address AD loaded by the processor 411 and transfers it to the output FIFO 415.

The input DMA controller 416 and the output DMA controller 417 are provided for the purpose of enabling data to be transferred between the forward side and rearward side DSP modules 410 and the memory 412 without through the processor 411 (without inputting the data into the processor 411).

In this DSP module 410, an arbiter 413 is provided to control data I/O requests to the memory 412 so that access contention does not occur when data is stored in and read out from the memory 412.

When the system is arranged so that the processor 411 controls data I/O requests to the memory 412 or the input DMA controller 416 and the output DMA controller 417 control data I/O requests to the memory 412, the arbiter 413 may be eliminated.

Though, in this embodiment, the memory 412, the arbiter 413, the input FIFO 414, the output FIFO 415, the input DMA controller 416 and the output DMA controller 417 are all built in the DSP module 410, at least a part of these elements may be provided outside the module. All these elements may be provided separately from the processor 411. That is, the DSP module 410 may only comprise the processor 411.

Operation of the image processing apparatus 400 will be described, hereinbelow.

In this image processing apparatus 400, serial data is input into the DSP module 410 of each stage cycle by cycle.

The "one cycle" is determined depending on the data transfer rate of the system connected forward of the image processing apparatus 400 and the capacity of the data buffer. For example, when a line image sensor is connected forward of the image processing apparatus 400, image data is stored in the data buffer line by line and is transferred at the cycle of the horizontal synchronizing signal. In this case, the "one cycle" is equal to the cycle of the horizontal synchronizing signal and the size of data transferred at one time is equal to the amount of image data for one line.

At least one of the DSP modules 410 interconnected in the cascade connection is used in a first fashion where processed data obtained by carrying out predetermined processing on input data and input data unprocessed are output. The DSP module 410 used in the first fashion will be sometimes referred to as "the first fashion DSP module", hereinbelow. Some of the other DSP modules are used in a second fashion where the DSP modules function solely as a processing means, and some of the other DSP modules are used in a third fashion where the DSP modules function as a data bypass. The DSP module 410 used in the second fashion will be sometimes referred to as "the second fashion DSP module", and the DSP module 410 used in the third fashion will be some times referred to as "the third fashion DSP module", hereinbelow.

The first to third fashion DSP modules 410 execute the following processing in one cycle.

(1) The First Fashion DSP Module 410
a) Storing in the memory 412 data transferred from the DSP module 410 of the forward stage.
b) Carrying out processing on the data which has been stored in the memory 412 for one cycle according to the program data and storing the processed data in the memory 412.
c) Transferring to the DSP module 410 of the rearward stage processed data which is obtained by processing the data transferred two cycles before and has been stored in the memory for one cycle and unprocessed data which has been stored in the memory 412 for two cycles without processed.

(1) The Second Fashion DSP Module 410
a) Storing in the memory 412 data transferred from the DSP module 410 of the forward stage.
b) Carrying out processing on the data which has been stored in the memory 412 for one cycle according to the program data and storing the processed data in the memory 412.
c) Transferring to the DSP module 410 of the rearward stage processed data which is obtained by processing the data transferred two cycles before and has been stored in the memory for one cycle.

(1) The Third Fashion DSP Module 410
a) Storing in the memory 412 data transferred from the DSP module 410 of the forward stage.
b) Transferring to the DSP module 410 of the rearward stage unprocessed data which has been stored in the memory 412 for one cycle without processed.

In this manner, data is stored in the memory 412 of each DSP module 410 for a predetermined time so that pipeline processing can be carried out without delay.

Two pieces of data S1 and S2 input from the system connected before the image processing apparatus 400 are converted into a piece of serial data by the data convertor 420 and the serial data is transferred to the first stage DSP module DSP0. Then final processed data is transferred to the system connected behind the image processing apparatus 400 from the last DSP module DSP6.

When a single piece of data is to be processed, the data convertor 420 is unnecessary.

The DSP modules 410 may be arranged so that each can distinguish input information and structure (size) of each piece of data in order to divide the transferred serial data into pieces of data. It is possible to add in advance structure information as a header to the initial data and adds the header on the software to the data obtained by processing. It is further possible to add information for identifying the DSP module 410 by which the data is to be processed to the header.

With this arrangement, parallel processing to be executed by two or more DSP modules 410 on the same data can be realized with the DSP modules 410 kept connected in the cascade connection (in series).

Figure 3A:
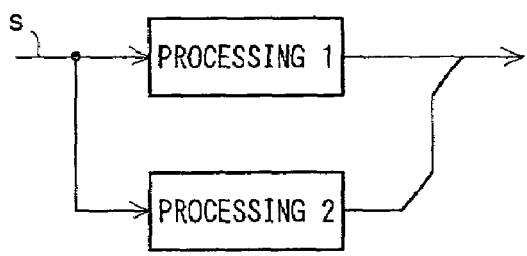
FIGS. 3A and 3B are views for illustrating operation of the image processing apparatus of the first embodiment when processing 1 and processing 2 are to be carried out in parallel.
Figure 3B:
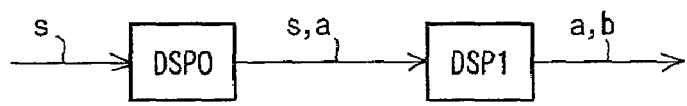

For example, when processing 1 and processing 2 are to be carried out in parallel as shown in FIG. 3A, the first stage and second stage DSP modules DSP0 and DSP1 are employed as the first fashion modules. In this case, input data s (unprocessed data) and processed data a obtained by carrying out the processing 1 on the input data s are output from the first stage DSP module DSP0 and input into the second stage DSP module DSP1 as shown in FIG. 3B. The second stage DSP module DSP1 carries out the processing 2 on the input data s and outputs from the data output port DO processed data a obtained by carrying out the processing 2 on the input data s and the processed data a as input into the second stage DSP module DSP1 as shown in FIG. 3B. In this manner, the processed data a and the processed data b respectively obtained by carrying out the processing 1 and the processing 2 in parallel on the input data s can be obtained from the data output port DO of the second stage DSP module DSP1 as shown in FIG. 3B. Further, since the DSP modules DSP0 and DSP1 carry out the processing in so-called pipeline processing system where the input data and the processed data are once stored in the memory 412 and outputs them subsequently at a predetermined timing, parallel processing can be realized without deterioration in processing speed.

A larger number of parts of processing can be carried out in parallel by connecting the like number of DSP modules 410 in series.

Figure 4A:
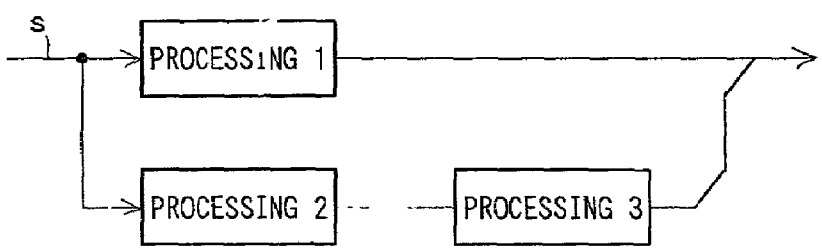
FIGS. 4A and 4B are views for illustrating operation of the image processing apparatus of the first embodiment when processing 2 and processing 3 to be carried out serially are to be carried out in parallel to processing 1.
Figure 4B:

Further, when processing 2 and processing 3 to be carried out serially are to be carried out in parallel to processing 1 as shown in FIG. 4A, the first stage to third stage DSP modules DSP0, DSP1 and DSP2 are employed as the first fashion modules. In this case, input data s (unprocessed data) and processed data a obtained by carrying out the processing 1 on the input data s are output from the first stage DSP module DSP0 and input into the second stage DSP module DSP1 as shown in FIG. 4B. The second stage DSP module DSP1 carries out the processing 2 on the input data s and inputs processed data a obtained by carrying out the processing 2 on the input data s and the processed data a as input into the second stage DSP module DSP1 into the third stage DSP module DSP2 as shown in FIG. 4B. The third stage DSP module DSP2 carries out the processing 3 on the input data b and outputs from the data output port DO processed data c obtained by carrying out the processing 3 on the input data b and the processed data a as input into the second stage DSP module DSP1 and the third stage DSP module DSP2 as shown in FIG. 4B. In this manner, the processed data a obtained by carrying out the processing 1 on the input data s and the processed data c obtained by serially carrying out the processing 2 and the processing 3 on the input data s in parallel to the processing 1 can be obtained from the data output port DO of the third stage DSP module DSP2 as shown in FIG. 4B.

As can be understood from description above, in the image processing apparatus 400 of this embodiment, addition of parallel processing can be dealt with by simply changing the software with the processing speed kept unchanged and without enlarging the circuit size. Further, since a plurality of parts of processing to be serially carried out may be added in parallel to the existing processing, the circuit can be freely changed to include serial connections and parallel connections in any manner.

Further, since parallel processing can be added by changing the software, even change in contents of processing or addition of processing which involves change in connection of the image processing portions such as change from serial processing to parallel processing or change from parallel processing to serial processing can be flexibly dealt with without changing the circuit board.

Further a circuit board can be used in common by a plurality of image processing apparatuses which are different in contents of processing so long as they are substantially equivalent in processing size, which results in lower cost of the image processing apparatus.

Further, in the image processing apparatus 400 of the embodiment described above, the data transfer clocks CLK0 for data transfer between the respective pairs of DSP modules 410 are the same in frequency, and data transfer port widths between the pairs of DSP modules are all equal to eachother. Accordingly, even change in the data volume due to change and/or addition of contents of image processing can be easily dealt with by simply determining the frequency of the data transfer clock solely on the basis of the data volume to be transferred between the DSP modules 410.

This point will be described in more detail with reference to FIGS. 5A to 5C, here in below.

Figures 5A, 5B, 5C:
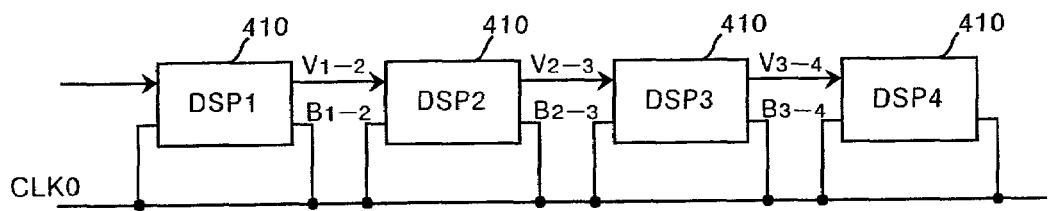
FIGS. 5A to 5C are views for illustrating the relation between the data transfer clock CLK0 and the data volume V and the data transfer port width.

In FIGS. 5A to 5C, V represents the data volume to be transferred between the DSP modules 410 ($V_{1-2}$ representing that between the second stage DSP module DSP1 and the third stage DSP module DSP2, $V_{2-3}$ representing that between the third stage DSP module DSP2 and the fourth stage DSP module DSP3, $V_{3-4}$ representing that between the fourth stage DSP module DSP3 and the fifth stage DSP module DSP4) and B represents the data transfer port width between the DSP modules 410 ($B_{1-2}$ representing that between the second stage DSP module DSP1 and the third stage DSP module DSP2, $B_{2-3}$ representing that between the third stage DSP module DSP2 and the fourth stage DSP module DSP3, $B_{3-4}$ representing that between the fourth stage DSP module DSP3 and the fifth stage DSP module DSP4).

Since data of volume V must be transferred within one cycle with a data transfer port width of B and the clocks CLKO for the data transfer between the DSP modules 410 are the same in frequency, the frequency of the clocks CLKO must be determined on the basis of the data transfer rate (data volume V/data transfer port width B) between the pair of DSP modules of the largest data transfer (the pair of DSP modules between which the largest volume of data is to be transferred).

When the data transfer port widths B are discretely set depending on the contents of image processing which is initially loaded in the image processing apparatus, the clocks CLKO for the data transfer are not necessarily determined on the basis of the pair of DSP modules 410 between which the data volume to be transferred is the largest ($V_{max}$) For example, in the example shown in FIG. 5B, the pair of DSP modules 410 between which the data volume to be transferred is the largest ($V_{max}$) is the pair of DSP3 and DSP4. However, the clocks CLKO for the data transfer are determined on the basis of the pair of DSP modules 410 between which the data transfer rate (data volume V/data transfer port width B) is the largest, DSP2 and DSP3 in this particular example.

When the data volume V to be transferred is changed due to change and/or addition of contents of image processing, the data transfer rate (data volume V/data transfer port width B) is also changed. Accordingly, the clocks CLKO for the data transfer have to be redetermined on the basis of the pair of DSP modules 410 between which the changed data transfer rate (data volume V/data transfer port width B) is the largest, DSP1 and DSP2 in this particular example.

To the contrast, when the data transfer port widths B between the pairs of DSP modules are set all equal to each other, the frequency of the clocks CLKO can be constantly determined on the basis of the volume of data to be transferred between the pair of DSP modules of the largest data transfer since, in this case, the data transfer rate is always the largest for the pair of DSO modules of the largest data transfer. For example, in the case of the example shown in FIG. 5C, before the data volume V is changed, the data volume to be transferred is the largest between the DSP modules DSP3 and DSP4 and the data transfer rate (data volume V/data transfer port width B) is also the largest between the DSP modules DSP3 and DSP4. After the data volume V is changed, the data volume to be transferred is the largest between the DSP modules DSP2 and DSP3 and the data transfer rate (data volume V/data transfer port width B) is also the largest between the DSP modules DSP2 and DSP3.

Further, in the image processing apparatus 400 of this embodiment, the short circuiting terminals J0 to J6 are connected in parallel to the respective DSP modules DSP0 to DSP6. Accordingly, when the circuit board is arranged so that all the DSP modules DSP0 to DSP6 can be mounted thereon, it is possible to mount only the DSP modules required for the time being with the portion where the DSP module is absent be short-circuited by the use of the short circuiting terminals so that the component connected forward of each of the DSP modules is connected to the component rearward of the DSP module. Then in the event that functions must be added, additional DSP modules 410 may be mounted on the circuit board with the connection between the corresponding short circuiting terminals broken. In this manner, the image processing apparatus can be prevented from becoming an expensive apparatus provided with excessive DSP modules as compared with functions required.

Further, by removably mounting the DSP modules 410 on the circuit board by way of sockets or the like, DSP modules which become unnecessary due to reduction in function of the image processing apparatus can be removed without adversely affecting the function of the image processing apparatus, whereby the image processing apparatus can be provided solely with necessary DSP modules 410, which results in reasonable cost.

Figure 6:
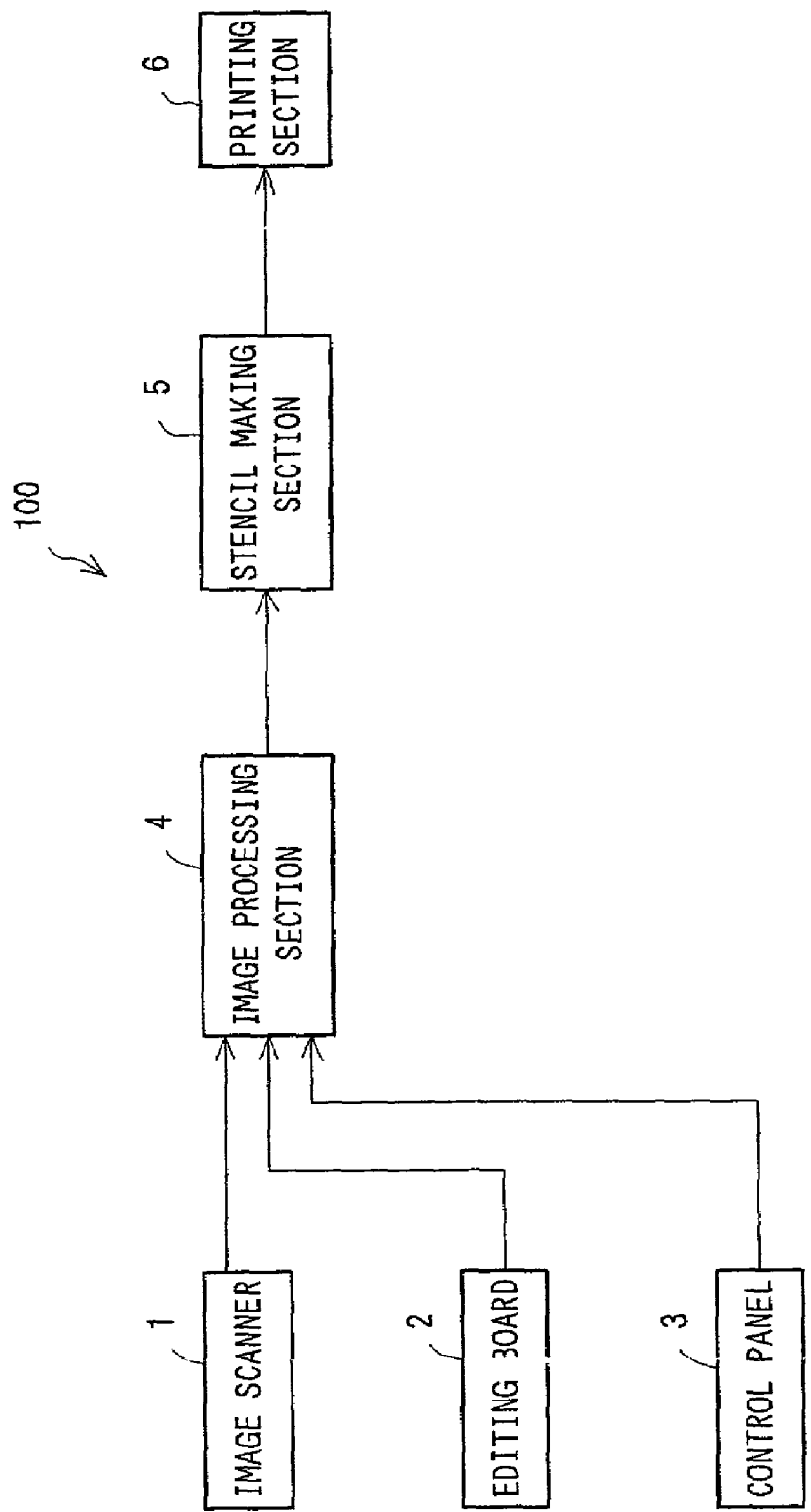
FIG. 6 is a schematic diagram showing a stencil printing system provided with an image processing section to which the image processing apparatus of the first embodiment is applied.

FIG. 6 is a schematic diagram showing a stencil printing system provided with an image processing section to which the image processing apparatus 400 of the first embodiment described above is applied.

As shown in FIG. 6, the stencil printing system 100 comprises a line image scanner 1, a tablet editing board 2 with which the user designates the position of a picture on an original, a control panel 3 through which the user inputs a rate of reduction or a rate of enlargement used in resolution conversion to be described later, an image processing section 4 which generates a thermal printer head control signal, a stencil making section 6 provided with a thermal head which image wise perforates a stencil material under the control of the head control signal, and printing section 6 which makes printing using a stencil made by a stencil making section 5.

FIG. 7A shows a first example of the image processing section 4 which is divided into means on the basis of function, and FIG. 7B shows a state where the image processing section 4 of the first example is formed by the image processing apparatus 400 of the first embodiment of the present invention.

As shown in FIG. 7A, the image processing section 4 of the first example comprises a main scanning direction resolution conversion means 10, a character original processing section formed by a single threshold binary-coding means 40, a picture original processing section 41 formed by a γ-correction means 12 and an error-diffusion binary-coding means 13, a binary image selection means 14, and a head control signal generating means 15.

The main scanning direction resolution conversion means 10 converts resolution in the main scanning direction of image data x input from the image scanner 1 at a rate designated by the user through the control panel 3 and generates resolution-converted image data Da.

The resolution conversion of the image data x in the sub-scanning direction is effected by controlling the ratio of the feed speed of the image scanner 1 relative to the original to the feed speed of the thermal head relative to the stencil material.

The single threshold binary-coding means 11 converts the density of each pixel represented by the image data Da into a maximum density (black) or a minimum density (white) on the basis of a single threshold value, and generates single-threshold binary-coded image data Db.

The γ-correction means 12 carries out γ-correction for correcting the dot gain due to the pixel arrangement characteristics of the error diffusion binary-coding means 13, the perforating characteristics of the stencil making section 5 and the printing characteristics of the printing section 6 and generates γ-corrected image data Dc.

The error diffusion binary-coding means 13 binary-codes the γ-corrected image data Dc while adding binary-coding error for each pixel to pixels before binary-coding thereby locally preserving the density represented by the γ-corrected image data Dc, and generates error-diffusion binary-coded image data Dd.

The binary image selection means 14 selects the single-threshold binary-coded image data Db or the error-diffusion binary-coded image data Dd on the basis of binary-coding system designating data z obtained by the user designating the position of the picture on the original on the editing board. That is, the binary image selection means 14 selects the single-threshold binary-coded image data Db when the binary-coding system designating data z designates binary-coding for characters and selects the error-diffusion binary-coded image data Dd when the binary-coding system designating data z designates binary-coding for pictures. The binary image selection means 14 inputs into the head control signal generating means 15 the selected image data as final image data De.

The head control signal generating means 15 generates a head control signal Dy which controls heat generation and the like of the thermal head so that a stencil is made faithfully to the final image data De.

When the image processing section 4 shown in FIG. 7A is formed by the image processing apparatus 400 of the first embodiment, functions of the means 10 to 15 are respectively assigned to the DSP modules 410 (DSP0 to DSP6) as shown in FIG. 7B. The data input into or output from the DSP modules (data to be bypassed and data after processing) is shown on the data bus line and data to be used in processing by each module 410 is shown on the module 410.

That is, the main scanning direction resolution conversion means 10, the single threshold binary-coding means 11, the γ-correction means 12, the error-diffusion binary-coding means 13, the binary image selection means 14 and the head control signal generating means 15 are respectively assigned to the DSP modules DSP0 to DSP5, and the DSP module DSP6 is used as a data bypass portion.

Thus, the resolution-converted image data Da, the single-threshold binary-coded image data Db, the γ-corrected image data Dc, the error-diffusion binary-coded image data Dd and the final image data De respectively correspond to the processed data a by the DSP0, the processed data b by the DSP1, the processed data c by the DSP2, the processed data d by the DSP3 and the processed data e by the DSP4, and the head control signal Dy corresponds to processed data f by the DSP5 and is passed through the DSP6 unprocessed.

Though, in the first example described above, one DSP module 410 is assigned to one means, one DSP module may be assigned to two or more serial means for a part to be added in parallel. For example, the serial part comprising the γ-correction means 12 and the error-diffusion binary-coding means 13 connected in parallel to the single threshold binary-coding means 11 may be assigned to a single DSP module DSP2 with the DSP module DSP3 used as a data bypass portion.

The data convertor 420 connected forward of the DSP modules DSP0 to DSP6 converts the image data x input from the image scanner 1 and the binary-coding system designating data z obtained by the user designating the position of the picture on the original on the editing board 2 into serial data.

The rate of reduction or the rate of enlargement input by the user through the control panel 3 is input into a CPU (not shown) and is loaded in the DSP module DSP0 (as the main scanning direction resolution conversion means 10) by the CPU.

The procedure for making processing program will be described, hereinbelow.

Input data (column A), data which is used for processing (column B), data which is used for processing and at the same time bypassed (column C), data which is not used for processing but is bypassed (column D), and processed data (column E) for each DSP module 410 are shown in the following table 1. In column A of table 1, numbers 1, 2 and 3 indicates the order of input of the pieces of data, the values in the brackets ($N_x$, $N_z$, $N_a$ ... $N_f$) represents the volume of the data and corresponds to the bit width of data output from each means shown in FIG. 7A.

TABLE 1

| | A | B | C | D | E |
|---|---|---|---|---|---|
| DSP0 | 1:$x_t$ ($N_x$)<br>2:$z_t$ ($N_z$) | $x_{t-1}$ | | $z_{t-2}$ | $a_{t-2}$ |
| DSP1 | 1:$a_{t-2}$ ($N_a$)<br>2:$z_{t-2}$ ($N_z$) | $a_{t-3}$ | $a_{t-4}$ | $z_{t-4}$ | $b_{t-4}$ |
| DSP2 | 1:$a_{t-4}$ ($N_a$)<br>2:$z_{t-4}$ ($N_z$)<br>3:$b_{t-4}$ ($N_b$) | $a_{t-5}$ | | $b_{t-6}$<br>$z_{t-6}$ | $c_{t-6}$ |
| DSP3 | 1:$z_{t-6}$ ($N_e$)<br>2:$b_{t-6}$ ($N_b$)<br>3:$c_{t-6}$ ($N_c$) | $c_{t-7}$ | | $b_{t-8}$<br>$z_{t-8}$ | $d_{t-8}$ |
| DSP4 | 1:$z_{t-8}$ ($N_z$)<br>2:$b_{t-8}$ ($N_b$)<br>3:$d_{t-8}$ ($N_d$) | $z_{t-9}$<br>$b_{t-9}$<br>$d_{t-9}$ | | | $e_{t-10}$ |
| DSP5 | 1:$e_{t-10}$ ($N_e$) | $e_{t-11}$ | | | $f_{t-12}$ |
| DSP6 | 1:$f_{t-12}$ ($N_f$) | | | $f_{t-13}$ | |

When making the processing program data for each of the DSP modules 410 (DSP0 to DSP6), the address of the data to be stored in the memory 412 is set referring to table 1, and the program data is made so that the following parts of processing (a) to (c) are executed in one cycle in the DSP module 410. In this particular example, the time the image scanner 1 takes to input one line of image data (will be referred to as "a line cycle", hereinbelow) is one cycle.

(a) Dividing the serial data into individual pieces of data on the basis of the order of input of the pieces of data and the volume of the data shown in column A, and stores them on the memory at the predetermined addresses.

(b) Carrying out predetermined processing on the data shown in the column B and stored in the memory 412 at the predetermined address and storing the processed data in the memory at the predetermined address.

(c) Transferring the pieces of data which are shown in the columns C, D and E and are stored in the memory 412 at the predetermined addresses.

In this particular example, the data input port width from the image scanner 1 to the data convertor 420 is set equal to the data output port width from the last stage DSP module DSP6 to the stencil making section 5, and equal to the data transfer port widths from the data convertor 420 to the first stage DSP module DSP0 and between each pair of DSP modules 410 (DSP0 to DSP6).

The clock generator 430 generates clocks to set all the data transfer speeds between the respective pairs of DSP modules DSP0 to DSP6 so that the whole data can be transferred between the pair of DSP modules 410 of the largest data transfer as serial data in one line cycle. That is, assuming that $N_x = N_z = N_a = \ldots = N_f$ in the column A, it is necessary to transfer three lines of data between each pair of DSP modules 410, the clock generator 430 is caused to generate clocks CLK0 at 6 MHz. This frequency is three times as high as the frequency of the clocks CLK2 (2 MHz) which are the DMA transfer clocks for the image data $x_t$ of line t input from the image scanner 1 into the data convertor 420 and the binary-coding system designating data $z_t$ of line t input into the data convertor 420 and the frequency of the DMA transfer clock for the data input from the last stage DSP module DSP6 into the stencil making section 5. The frequency of the transfer clocks CLK1 for transferring serial data from the data convertor 420 to the first stage DSP module DSP0 is set to 4 MHz, twice the frequency of the clocks CLK2, as a matter of convenience of combining two pieces of data into a piece of serial data.

When the amount of data to be transferred between a given pair of DSP modules 410 is of only one line or two lines, the excessive time, the time required to transfer one line of data or two lines of data, is set as a waiting time. With this arrangement, predetermined data can be transferred between each pair of DSP modules 410 within a predetermined number of cycles and pipeline processing can be carried out without delay.

The procedure for making the head control signal Dy on the basis of the processing program for each DSP module 410 thus prepared will be described next.

(1) Image data $x_t$ for line t read by the image scanner 1 and binary-coding system designating data $z_t$ for line t obtained by the user designating the position of the picture on the original on the editing board 2 are input into the data convertor 420 in parallel.

(2) The data convertor 420 converts the image data $x_t$ and the binary-coding system designating data $z_t$ into serial data and transfers the serial data to the first stage DSP module DSP0.

(3) The first stage DSP module DSP0 carries out the following processing in the current line cycle. The "current line cycle" means the period in which the image data $x_t$ for line t and the binary-coding system designating data $z_t$ for line t are input into the data convertor 420. This is applied also to the DSP modules DSP1 to DSP6 to be described later.

(a) Storing the image data $x_t$ for line t and the binary-coding system designating data $z_t$ for line t transferred from the data convertor 420 in the memory 412.

(b) Carrying out the main scanning resolution conversion on the image data $x_{t-1}$ for line (t-1) which has been transferred from the data convertor 420 and has been stored in the memory for one line cycle and storing processed image data $a_{t-1}$ in the memory 412. The rate of reduction or enlargement used in the main scanning resolution conversion has been loaded in advance in the built-in register of the processor 411 of the first stage DSP module DSP0 by the CPU.

(c) Transferring to the second stage DSP module DSP1 image data $a_{t-2}$ for line (t-2) which is obtained by processing one line cycle before and binary-coding system designating data $z_t$ for line (t-2) which has been stored in the memory 412 for two line cycles without being used by the first stage DSP module DSP0.

The memory 412 of the first stage DSP module DSP0 has a sufficient capacity to store image data $x_t$, $x_{t-1}$ for two lines before the main scanning direction resolution conversion, processed image data $a_{t-1}$, $a_{t-2}$ for two lines and binary-coding system designating data $z_t$, $z_{t-1}$, $z_{t-2}$ for three lines.

(4) The second stage DSP module DSP1 carries out the following processing in the current line cycle.

(a) Storing the processed (main scanning direction resolution conversion) image data $a_{t-2}$ for line (t-2) and the binary-coding system designating data $z_{t-2}$ for line (t-2) transferred from the first stage DSP module DSP0 in the memory 412.

(b) Carrying out the single threshold binary-coding on the processed image data $a_{t-3}$ for (t-3) line which has been transferred from the first stage DSP module DSP0 and has been stored in the memory 412 for one line cycle and storing processed image data $b_{t-3}$ in the memory 412.

(c) Transferring to the third stage DSP module DSP2 image data $b_{t-4}$ for line (t-4) which is obtained by processing one line cycle before, binary-coding system designating data $z_{t-4}$ for line (t-4) which has been stored in the memory 412 for two line cycles without being used by the second stage DSP module DSP1, and processed image data $a_{t-4}$ for line (t-4) transferred from the first stage DSP module DSP0 two line cycles before and processed by the second stage DSP module DSP1 one line cycle before.

The memory 412 of the second stage DSP module DSP1 has a sufficient capacity to store processed (main scanning direction resolution conversion) image data $a_{t-2}$, $a_{t-3}$, $a_{t-4}$ for three lines, processed (single threshold binary-coding) image data $b_{t-3}$, $b_{t-4}$ for two lines and binary-coding system designating data $z_{t-2}$, $z_{t-3}$, $z_{t-4}$ for three lines.

(5) The third stage DSP module DSP2 carries out the following processing in the current line cycle.

(a) Storing the processed (main scanning direction resolution conversion) image data $a_{t-4}$ for line (t-4), the binary-coding system designating data $Z_{t-4}$ for line (t-4), and processed (single threshold binary-coding) image data $b_{t-4}$ for line (t-4) transferred from the second stage DSP module DSP1 in the memory 412.

(b) Carrying out the γ-correction on the processed image data $a_{t-5}$ for (t-5) line transferred from the second stage DSP module DSP1 and stored in the memory 412 one line cycle before and storing processed image data $c_{t-5}$ in the memory 412.

(c) Transferring to the fourth stage DSP module DSP3 image data $c_{t-6}$ for line (t-6) which is obtained by processing one line cycle before, and binary-coding system designating data $z_{t-6}$ for line (t-6) and processed image data $b_{t-6}$ for line (t-6) transferred from the second stage DSP module DSP1 two line cycles before and stored in the memory 412 for two line cycles without being used by the third stage DSP module DSP2.

The memory 412 of the third stage DSP module DSP2 has a sufficient capacity to store processed (main scanning direction resolution conversion) image data $a_{t-4}$, $a_{t-5}$ for two lines, processed (single threshold binary-coding) image data $b_{t-4}$, $b_{t-5}$, $b_{t-6}$ for three lines, processed (γ-correction) image data $c_{t-5}$, $c_{t-6}$ for two lines and binary-coding system designating data $z_{t-4}$, $z_{t-5}$, $z_{t-6}$ for three lines.

(6) The fourth stage DSP module DSP3 carries out the following processing in the current line cycle.

(a) Storing binary-coding system designating data $z_{t-6}$ for line (t-6), processed (single threshold binary-coding) image data $b_{t-6}$ for line (t-6) and processed (γ-correction) image data $c_{t-6}$ for line (t-6) transferred from the third stage DSP module DSP1 in the memory 412.

(b) Carrying out the error diffusion binary-coding on the processed (γ-correction) image data $c_{t-7}$ for (t-7) line transferred from the third stage DSP module DSP2 and stored in the memory 412 one line cycle before and storing processed image data $d_{t-7}$ in the memory 412. For the error diffusion binary-coding, capacity for storing one line of binary error data is required.

(c) Transferring to the fifth stage DSP module DSP4 image data $d_{t-8}$ for line (t-8) which is obtained by processing one line cycle before, and binary-coding system designating data $z_{t-8}$ for line (t-8) and processed image data $b_{t-8}$ for line (t-8) transferred from the third stage DSP module DSP2 two line cycles before and stored in the memory 412 for two line cycles without being used by the third stage DSP module DSP2.

The memory 412 of the fourth stage DSP module DSP3 has a sufficient capacity to store processed (single threshold binary-coding) image data $b_{t-6}$, $b_{t-7}$, $b_{t-8}$ for three lines, processed (γ-correction) image data $c_{t-6}$, $c_{t-7}$ for two lines, processed (error diffusion binary-coding) image data $d_{t-7}$, $d_{t-8}$ for two lines, binary-coding system designating data $z_{t-6}$, $z_{t-7}$, $z_{t-8}$ for three lines, and one line of binary error data.

(7) The fifth stage DSP module DSP4 carries out the following processing in the current line cycle.

(a) Storing the binary-coding system designating data $z_{t-8}$ for line (t-8), processed (single threshold binary-coding) image data $b_{t-8}$ for line (t-8), and processed (error-diffusion binary-coding) image data $d_{t-8}$ for line (t-8) transferred from the fourth stage DSP module DSP3 in the memory 412.

(b) Carrying out the binary image selection according to binary-coding system designating data $z_{t-9}$ for line (t-9) transferred from the fourth stage DSP module DSP3 and stored in the memory 412 one line cycle before and storing obtained image data $e_{t-9}$ in the memory 412. For example, when the binary-coding system designating data $z_{t-9}$ for line (t-9) designates binary-coding for characters, the processed (single threshold binary-coding) image data $b_{t-9}$ is stored in the memory 412, whereas when the binary-coding system designating data $z_{t-9}$ for line (t-9) designates binary-coding for pictures, processed (error-diffusion binary-coding) image data $d_{t-9}$ is stored in the memory 412.

(c) Transferring to the sixth stage DSP module DSP 5 image data $e_{t-1}$ for line (t-10) which is obtained by processing one line cycle before.

The memory 412 of the fifth stage DSP module DSP4 has a sufficient capacity to store processed (single threshold binary-coding) image data $b_{t-8}$, $b_{t-9}$ for two lines, processed (error-diffusion binary-coding) image data $d_{t-8}$, $d_{t-9}$ for two lines, binary-coding system designating data $z_{t-8}$, $z_{t-9}$ for two lines and image data $e_{t-9}$, $e_{t-10}$ for two lines.

(8) The sixth stage DSP module DSP5 carries out the following processing in the current line cycle.

(a) Storing image data $e_{t-10}$ for line (t-10) obtained by the binary image selection transferred from the fifth stage DSP module DSP4 in the memory 412.

(b) Carrying out the head control signal generating processing according to image data $e_{t-11}$ for line (t-11) transferred from the fifth stage DSP module DSP4 and stored in the memory 412 one line cycle before and heat history data for head control to be described later and storing an obtained signal $f_{t-11}$ in the memory 412. For the head control signal generating processing, capacity for storing one line of heat history data is required.

(c) Transferring to the seventh stage DSP module DSP6 head control signal $f_{t-12}$ for line (t-12) which is obtained by processing one line cycle before.

The memory 412 of the sixth stage DSP module DSP5 has a sufficient capacity to store image data $e_{t-10}$, $e_{t-11}$, for two lines, head control signals $f_{t-11}$ and $f_{t-12}$ for two lines and one line of heat history data.

(9) The seventh stage DSP module DSP6 carries out the following processing in the current line cycle.

(a) Storing the head control signal $f_{t-12}$ for line (t-12) transferred from the sixth stage DSP module DSP5 in the memory 412.

(b) Transferring to the stencil making section 5 the head control signal $f_{t-13}$ for line (t-13) transferred from the sixth DSP module DSP5 and stored in the memory 412 for one line cycle unprocessed. That is the seventh DSP module DSP6 functions as a data bypass portion and does not carry out any processing.

The head control signal $f_{t-13}$ output from the seventh DSP module DSP6 makes a head control signal Dy shown in FIG. 7A for the current cycle.

The memory 412 of the seventh stage DSP module DSP6 has a sufficient capacity to store head control signals $f_{t-12}$ and $f_{t-13}$ for two lines.

The stencil making section 5 makes a stencil on the basis of the head control signal Dy thus generated. The printing section 6 makes print using the stencil. As a result, printing on which the character region and the picture region are respectively suitably processed can be obtained.

FIG. 8A shows a second example of the image processing section 4 which is divided into means on the basis of function, and FIG. 8B shows a state where the image processing section 4 of the second example is formed by the image processing apparatus 400 of the first embodiment of the present invention.

The second example differs from the first example in the contents of processing in the picture original processing section 41. In the second example, the third stage DSP module DSP2 functions as a halftone binary-coding means 20 and the fourth stage DSP module DSP3 functions as a data bypass portion as shown in FIG. 8B.

Accordingly, processed (halftone binary-coding) image data Di makes the processed data c by the third stage DSP module DSP2 and through data for the fourth stage DSP module DSP3, and binary-coding system designating data $z_{t-8}$ for line (t-8), processed (single threshold binary-coding) image data $b_{t-8}$ for line (t-8), and processed (halftone binary-coding) image data $c_{t-8}$ for line (t-8) are output from the fourth stage DSP module DSP3.

As can be understood through comparison of FIGS. 7B and 8B, the amount of contents of processing can be freely increased or reduced in the same circuit size without increasing or reducing the number of the DSP modules 410.

FIG. 9A shows a third example of the image processing section 4 which is divided into means on the basis of function, and FIG. 9B shows a state where the image processing section 4 of the third example is formed by the image processing apparatus 400 of the first embodiment of the present invention.

The third example differs from the first example in that a thin character enhancing means 16 is added to the character original processing section 40. In the third example, the main scanning direction resolution conversion means 10, the thin character enhancing means 16, the single threshold binary-coding means 11, the γ-correction means 12, the error-diffusion binary-coding means 13, the binary image selection means 14 and the head control signal generating means 15 are respectively assigned to the DSP modules DSP0 to DSP6.

Thus, the resolution-converted image data Da, the thin character enhanced image data Dg, the single-threshold binary-coded image data Db, the γ-corrected image data Dc, the error-diffusion binary-coded image data Dd, the final image data De and the head control signal Dy respectively correspond to the processed data a by the DSP0, the processed data b by the DSP1, the processed data c by the DSP2, the processed data d by the DSP3, the processed data e by the DSP4, the processed data f by the DSP5 and the processed data g by the DSP6.

Figure 10A:
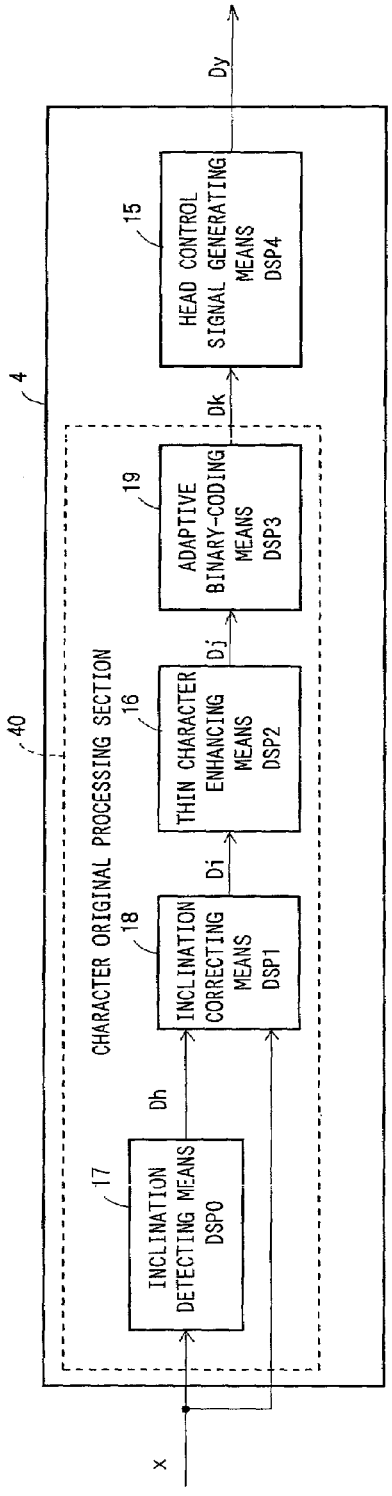
FIG. 10A is a block diagram showing a fourth example of the image processing section of the stencil printing system which is divided into means on the basis of function.
Figure 10B:
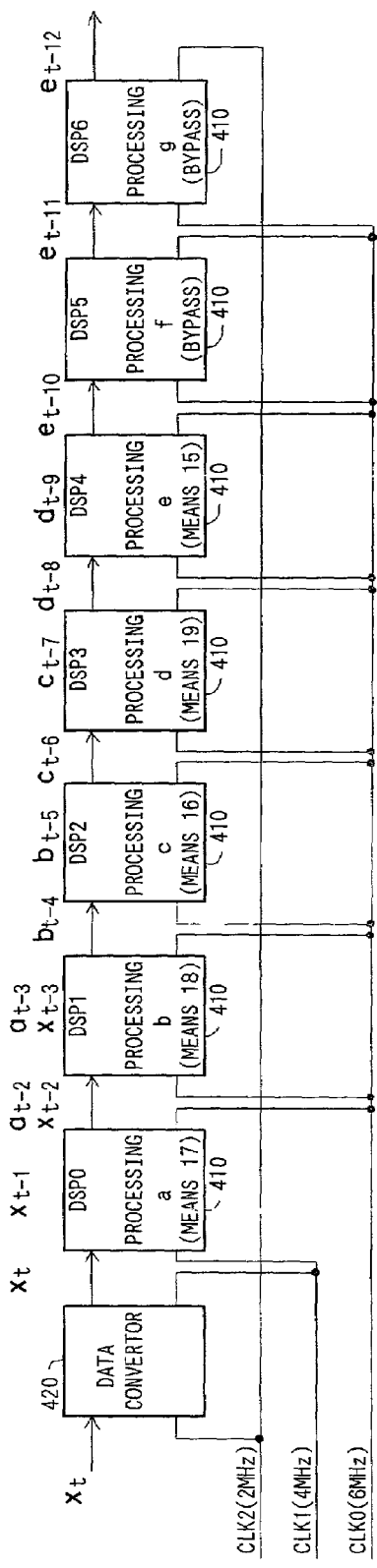
FIG. 10B is a block diagram showing a state where the image processing section of the fourth example is formed by the image processing apparatus of the first embodiment of the present invention.

FIG. 10A shows a fourth example of the image processing section 4 which is divided into means on the basis of function, and FIG. 10B shows a state where the image processing section 4 of the fourth example is formed by the image processing apparatus 400 of the first embodiment of the present invention.

In this example, the image processing section 4 comprises an inclination detecting means 17, an inclination correcting means 18, a thin character enhancing means 16, an adaptive binary-coding means 19 and a head control signal generating means 15.

The inclination detecting means 17 detects an angle of inclination by which a character train in a character original as input from the image scanner 1 inclines to the direction of scanning. The inclination correcting means 18 makes the character train parallel to the direction of scanning by resampling the image read by the image scanner 1 according to the angle of inclination detected by the inclination detecting means 17. Further, in order to prevent generation of thin spots in the characters and/or deformation of the characters due to blur caused by the optical system of the image scanner 1, the thin character enhancing means 19 enhances thin lines of very small characters and the adaptive binary-coding means 19 changes the threshold value for binary-coding the value of each pixel according to the reading density of the pixel.

Figure 14A:
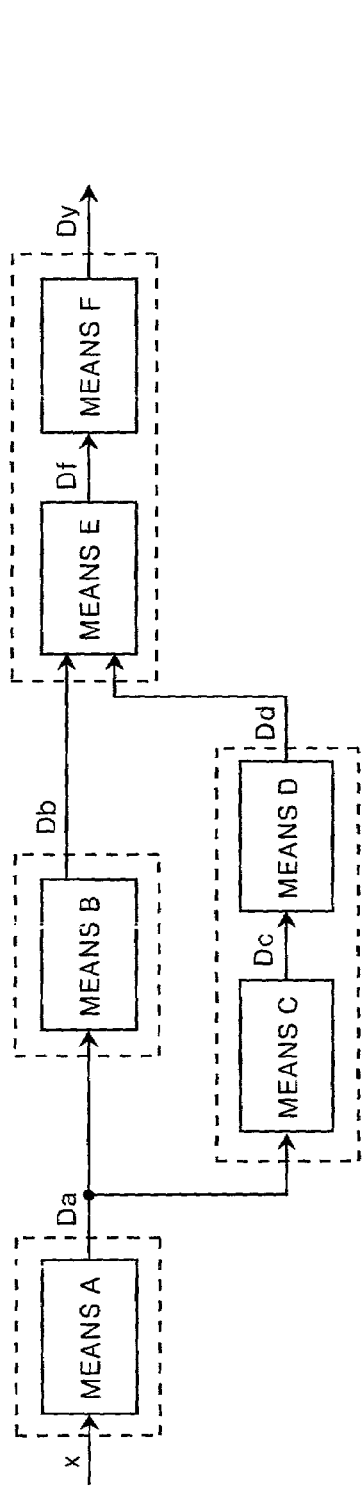
FIGS. 14A and 14B are views for illustrating the drawbacks of the conventional image processing apparatus.
Figure 14B:
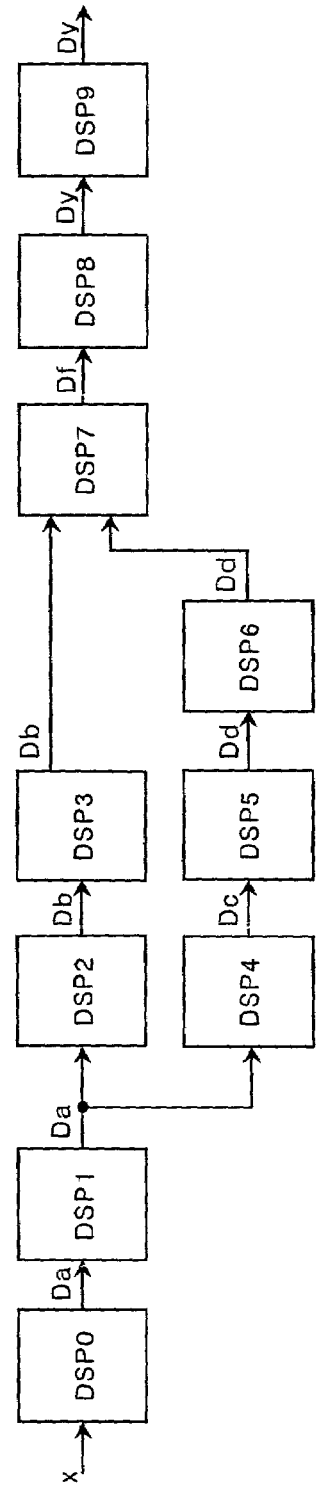

When the image processing section 4 has been realized by the circuit shown in FIG. 14B, it is necessary to change the circuit board in order to change the image processing section 4 as shown in FIG. 10A. To the contrast, in the fourth example, such change in function can be dealt with, for instance, by assigning the inclination detecting means 17, the inclination correcting means 18, the thin character enhancing means 16, the adaptive binary-coding means 19 and the head control signal generating means 15 respectively to the first to fifth stage DSP modules DSP0 to DSP4, and assigning data bypass portions to the sixth and seventh stage DSP modules DSP5 and DSP6 as shown in FIG. 10B, with the processing program data changed.

Though only image data $x_t$ is input into the data convertor 420, the data convertor 420 generates serial data on the basis of assumption that all the bits for the binary-coding system designating data $z_t$ are all "0" or "1" and transfers the serial data to the first stage DSP module DSP0.

In the fourth example, the inclination detecting signal Dh, the inclination corrected image signal Di, the thin character enhanced image data Dj, the adaptive binary-coded image data Dk, and the head control signal Dy respectively correspond to the processed data a by the DSP0, the processed data b by the DSP1, the processed data c by the DSP2, the processed data d by the DSP3 and the processed data e by the DSP4, and the head control signal Dy corresponds to through data from the DSP5 and DSP6.

It is possible to change and/or add to the contents of processing by loading processing program from the CPU in a desired DSP module 410 in response to selection of the user. This will be described with reference to FIGS. 7A, 7B, 8A and 8B.

It is assumed that the control panel 3 is provided with a means for selecting which of error-diffusion binary-coding and halftone binary-coding is to be carried out on a picture. Processing program suitable for the selection is automatically loaded in the third and fourth stage DSP modules DSP2 and DSP3. That is, when the error-diffusion binary-coding is selected, γ-correction program is loaded in the third stage DSP module DSP2 and error-diffusion binary-coding program is loaded in the fourth stage DSP module DSP3. When the halftone binary-coding is selected, halftone binary-coding program is loaded in the third stage DSP module DSP2 with the fourth stage DSP module DSP3 caused to function as a data bypass portion.

In fifth and sixth examples shown in FIGS. 11 and 12, at least a part of the DSP modules DSP0 to DSP6 is removable.

Though, in the first to fourth examples described above, a fixed number of DSP modules 410 are kept mounted on the circuit board, a possible smallest number of DSP modules 410 are mounted on the circuit board in the fifth and sixth examples. This will be described hereinbelow on the basis of assumption that functions are added as shown in FIGS. 8A and 9A to those shown in FIG. 13, where only a character original processing function is provided.

Figure 13:
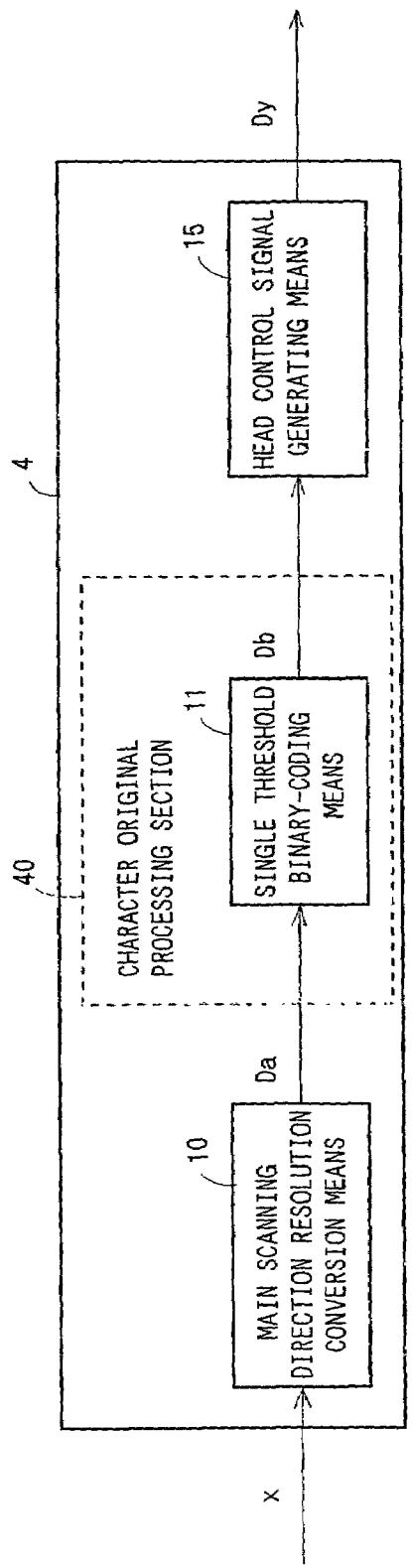
FIG. 13 is a block diagram showing a basic arrangement of the image processing section of the stencil printing system.

In the fifth example shown in FIG. 11, the circuit is arranged in the following manner.
(a) To be able to interconnect up to seven DSP modules 410 in cascade connection since up to seven DSP modules 410 become necessary to deal with increase of functions as shown in FIGS. 8A and 9A.
(b) The main scanning direction resolution conversion means 10 and the head control signal generating means 15 are used before and after addition of functions and accordingly respectively assigned to the first stage DSP module DSP0 and the last stage DSP module DSP6. Further, when the functions are as shown in FIG. 13, only one DSP module 410 is required in addition to the first stage DSP module DSP0 and the last stage DSP module DSP6. This one DSP module 410 is assigned to the second stage DSP module DSP1.
(c) Since the first, second and last stage DSP modules DSP0, DSP1 and DSP6 are constantly mounted on the circuit board before and after addition of functions, they may be fixedly mounted on the circuit board and need not be provided with a switching means.
(d) The other DSP modules 410 are sometimes removed from the circuit board. Accordingly, the other DSP modules 410 (DSP2 to DSP5) are removably mounted on the circuit board, for instance, by way of sockets and are provided with short-circuiting terminals J2 to J5 in parallel to the DSP modules 410 in order to jump the DSP module when removed.

When the arrangement of the fifth example shown in FIG. 11 is modified to function as shown in FIG. 13, the single threshold binary-coding means 11 is assigned to the second stage DSP module DSP1, and the third to sixth stage DSP modules DSP2 to DSP5 are removed with the short-circuiting terminals J2 to J5 all short-circuited. With this arrangement, data output from the second stage DSP module DSP1 is directly input into the last stage DSP module DSP6 jumping the third to sixth stage DSP modules DSP2 to DSP5.

When functions are to be added as shown in FIG. 8A in this state, the third stage and fourth stage DSP modules DSP2 and DSP3 are mounted with the corresponding short-circuiting terminals opened and the halftone binary-coding means 20 and the binary image selection means 14 are respectively assigned to the third stage and fourth stage DSP modules DSP2 and DSP3. In this state, data output from the fourth stage DSP module DSP3 is input into the last stage DSP module DSP6 jumping the fifth and sixth stage DSP modules DSP4 and DSP5.

When functions are to be further added as shown in FIG. 9A in this state, the fifth and sixth stage DSP modules DSP4 and DSP5 are further mounted and the short-circuiting terminals J4 and J5 are opened, whereby all the seven DSP modules DSP0 to DSP6 are interconnected in cascade connection. In this state, the thin character enhancing means 16, the single threshold binary-coding means 11, the γ-correction means 12, the error-diffusion binary-coding means 13 and the binary image selection means 14 are respectively assigned to the DSP modules DSP1 to DSP5.

In the sixth example shown in FIG. 12, the circuit is arranged in the following manner.
(a) To be able to interconnect up to seven DSP modules 410 in cascade connection since up to seven DSP modules 410 become necessary to deal with increase of functions as shown in FIGS. 8A and 9A.
(b) The main scanning direction resolution conversion means 10, the single threshold binary-coding means 11 and the head control signal generating means 15 are used before and after addition of functions and accordingly respectively assigned to the first stage DSP module DSP0, the third stage DSP module DSP2 and the last stage DSP module DSP6.
(c) Since the first, third and last stage DSP modules DSP0, DSP2 and DSP6 are constantly mounted on the circuit board before and after addition of functions, they may be fixedly mounted on the circuit board and need not be provided with a switching means.
(d) The other DSP modules 410 are sometimes removed from the circuit board. Accordingly, the other DSP modules 410 (DSP1 and DSP3 to DSP5) are removably mounted on the circuit board, for instance, byway of sockets (or connectors) and are provided with short-circuiting terminals J1, J3 to J5 in parallel to the DSP modules 410 in order to jump the DSP module when removed.

When the arrangement of the sixth example shown in FIG. 12 is modified to function as shown in FIG. 13, the second DSP module DSP1 and the fourth to sixth stage DSP modules DSP3 to DSP5 are removed with the short-circuiting terminals J1 and J3 to J5 all short-circuited. With this arrangement, data output from the first stage DSP module DSP0 is directly input into the third stage DSP module DSP2 jumping the second stage DSP module DSP1 and data output from the third stage DSP module DSP2 is directly input into the last stage DSP module DSP6 jumping the fourth to sixth stage DSP modules DSP3 to DSP5.

When functions are to be added as shown in FIG. 8A in this state, the fourth stage and fifth stage DSP modules DSP3 and DSP4 are mounted with the corresponding short-circuiting terminals J3 and J5 opened and the halftone binary-coding means 20 and the binary image selection means 14 are respectively assigned to the fourth stage and sixth stage DSP modules DSP3 and DSP5. In this state, data output from the first stage DSP module DSP0 is input into the third stage DSP module DSP2 jumping the second stage DSP module DSP1, data output from the third stage DSP module DSP2 is input into the sixth stage DSP module DSP4 jumping the fifth stage DSP module DSP4, and data output from the sixth stage DSP module DSP5 is input into the last stage DSP module DSP6.

When functions are to be further added as shown in FIG. 9A in this state, the second and fifth stage DSP modules DSP1 and DSP4 are further mounted and the short-circuiting terminals J1 and J4 are opened, whereby all the seven DSP modules DSP0 to DSP6 are interconnected in cascade connection. In this state, the thin character enhancing means 16, the γ-correction means 12, and the error-diffusion binary-coding means 13 are respectively assigned to the DSP modules DSP1, DSP3 and DSP4.

Thus, in the fifth and sixth examples, the image processing apparatus need not be constantly provided with DSP modules 410 in a number required to execute possible largest functions but the number of the DSP modules 410 may be increased or reduced according to the functions required. Accordingly, the problem that the image processing apparatus is provided with modules 410 which are excessive to the functions to be executed can be avoided.

When all the DSP modules 410 are removably mounted with the switching means provided for each of the DSP modules 410 as shown in FIG. 1, addition of functions which the user initially does not conceive can be dealt with.

Though, in the embodiment described above, pipeline processing can be carried out without delay by carrying out storing unprocessed data and/or processed data in the memory and reading out unprocessed data and/or processed data from the memory to output it through the output port every predetermined cycles, the cycle time of the pipe line processing may be changed according to the size and/or shape of the image and the cycle may be changed by module to module according to the condition of processing.

What is claimed is:

1. An image processing apparatus comprising:
    at least two signal processor modules interconnected with each other in series, each of the signal processor modules having an input port through which data is input, a memory which stores data, a signal processor portion which carries out processing on input data according to a program and an output port through which data is output,
    wherein at least one of the signal processor modules outputs in parallel both unprocessed input data and processed data obtained by processing the input data,
    wherein said at least one of the signal processor modules stores within predetermined temporal periods in the memory unprocessed input data as input through the input port and propessed data obtained by reading out and processing unprocessed input data stored in the memory a predetermined number of cycles before and outputs within the predetermined temporal periods through the output port unprocessed data and processed data stored in the memory the predetermined number of cycles before, and
    wherein the other signal processor module(s) stores within predetermined temporal periods in the memory unprocessed input data as input through the input port and processed data obtained by reading out and processing unprocessed input data stored in the memory a predetermined number of cycles before and outputs within the predetermined temporal periods through the output port processed data stored in the memory the predetermined number of cycles before, or stores in the memory unprocessed input data as input through the input port and outputs through the output port unprocessed input data stored in the memory the predetermined number of cycles before.

2. The image processing apparatus according to claim 1, further comprising:
    a synchronous circuit which causes data transfer between signal processor modules to occur in synchronization with clocks which are the same in phase and frequency.

3. The image processing apparatus according to claim 2, wherein the data transfer widths between the signal processor modules are equal to each other and the synchronous circuit determines the frequency of the transfer clock on the basis of the data transfer rate between the pair of signal processor modules between which the largest amount of data is to be transferred.

4. An image processing apparatus comprising:
    at least two signal processor modules interconnected with each other in series, each of the signal processor modules having an input port through which data is input, a memory which stores data, a signal processor portion which carries out processing on input data according to a program and an output port through which data is output,
    a mounting means, on which a signal processor module is removably mounted, provided for at least one of the signal processor modules; and
    a switching means provided for said at least one signal processor module to transfer data to the signal processor module through its input port when it is mounted on the
    mounting means and to transfer the same to a component forward of the signal processor module when it is not mounted on the mounting means,
    wherein at least one of the signal processor modules outputs in parallel both unprocessed input data and processed data obtained by processing the input data.

* * * * *